(12) United States Patent
Chen et al.

(10) Patent No.: US 9,199,692 B2
(45) Date of Patent: Dec. 1, 2015

(54) CLIPLESS BICYCLE PEDAL WITH MEASURING DEVICE

(71) Applicants: Chung-I Chen, Taichung (TW); Chih-Hsiang Shen, Taichung (TW)

(72) Inventors: Chung-I Chen, Taichung (TW); Chih-Hsiang Shen, Taichung (TW)

(73) Assignee: WELLGO PEDAL'S CORP., Taichung (TW)

(*) Notice: Subject to any disclaimer, the term of this patent is extended or adjusted under 35 U.S.C. 154(b) by 0 days.

(21) Appl. No.: 14/280,676

(22) Filed: May 19, 2014

(65) Prior Publication Data

US 2014/0251079 A1    Sep. 11, 2014

Related U.S. Application Data

(63) Continuation-in-part of application No. 13/719,720, filed on Dec. 19, 2012, now Pat. No. 8,844,404.

(51) Int. Cl.
*B62M 3/08* (2006.01)

(52) U.S. Cl.
CPC ............ *B62M 3/086* (2013.01); *B62M 3/08* (2013.01); *B62K 2207/00* (2013.01); *Y10T 74/217* (2015.01)

(58) Field of Classification Search
CPC ........ B62M 3/08; B62M 3/083; B62M 3/086; A43B 5/14; A63B 22/06; A61B 5/221
See application file for complete search history.

(56) References Cited

U.S. PATENT DOCUMENTS

| | | | | |
|---|---|---|---|---|
| 5,765,450 | A * | 6/1998 | Kruger et al. | 74/594.6 |
| 6,205,885 | B1 * | 3/2001 | Hermansen et al. | 74/594.6 |
| 8,327,723 | B2 | 12/2012 | Roudergues et al. | |
| 8,844,404 | B2 * | 9/2014 | Chen et al. | 74/594.4 |
| 8,961,191 | B2 * | 2/2015 | Hanshew | 439/22 |
| 2006/0248965 | A1 * | 11/2006 | Wyatt et al. | 73/862.391 |
| 2008/0040937 | A1 * | 2/2008 | Champoux et al. | 33/1 N |

FOREIGN PATENT DOCUMENTS

DE   102005027181 A1 * 12/2006
WO   WO 2010109397 A1 *  9/2010  ............... G01L 7/10

* cited by examiner

*Primary Examiner* — Vicky Johnson

(57) ABSTRACT

A bicycle pedal is provided to be releasably secured to a cleat that is attached to a sole of a cyclist's shoe. The pedal includes a spindle, a pedal body mounted for rotation on the spindle and a measuring device. The pedal body has front and rear engaging portions which releasably engage with respective front and rear lips of the cleat when the pedal is secured to the cleat. The measuring device is disposed in the pedal body and includes a sensor configured to detect the tightness between the pedal body and the cleat.

8 Claims, 6 Drawing Sheets

CLIPLESS BICYCLE PEDAL WITH MEASURING DEVICE

CROSS-REFERENCE TO RELATED APPLICATION

This is a continuation-in-part of co-pending application Ser. No. 13/719,720, filed on Dec. 19, 2012.

BACKGROUND OF THE INVENTION

1. Field of the Invention

The present invention relates to a pedal for use on a bicycle, and more particularly to a clipless pedal with a measuring device configured to detect tightness between the pedal and a cleat attached to a sole of a cyclist's shoe.

2. Description of Related Art

Various bicycle pedal arrangements exist which allow the pedal to be releasably secured to a cleat provided underneath a cyclist's shoe. These pedal arrangements normally have a pedal body which is rotatably mounted on a spindle. The pedal body has a front engaging portion and a rear engaging portion. The cleat has front and rear lips which releasably engage with the respective front and rear engaging portions of the pedal body.

Normally the rear engaging portion of the pedal body is biased by a spring towards a locked position. The cleat is engaged with the pedal body by firstly engaging the front lip of the cleat with the front engaging portion. The rear engaging portion is then forced away from the locked position against a spring bias by the rear lip of the cleat until the cleat is located in a position in which the rear engaging portion can return to its normal position to lock around the cleat.

It will be appreciated that the bias of the rear engaging portion towards the locked position must be sufficient to prevent unintentional release of the rear lip during cycling. Moreover, the bias of the rear engaging portion has to be of a magnitude which enables an on-board measuring device, as disclosed in U.S. Pat. No. 8,327,723, to correctly measure forces or others developed by a cyclist on a bicycle pedal.

SUMMARY OF THE INVENTION

It is an object of this invention to provide a bicycle pedal which is releasably secured to a cleat provided on the lower surface of a cyclist's shoe where the tightness between the cleat and the pedal can be measured beforehand to determine whether the bias of the rear engaging portion of the pedal toward a locked position is sufficient to prevent unintentional release of the cleat during cycling and to be of a magnitude which ensures an on-board measuring device to obtain correct measurement data from the pedal during cycling.

According to the invention, the pedal includes a spindle, a pedal body and a measuring device. The pedal body is mounted for rotation on the spindle and having front and rear engaging portions which releasably engage with respective front and rear portions of the cleat when the pedal is secured to the cleat. The measuring device is disposed in the pedal body and includes a sensor configured to detect tightness between the pedal body and the cleat.

Specifically, the sensor of the measuring device includes an elastic metallic sheet and a strain gauge. The elastic metallic sheet is disposed on a top surface of the pedal body to contact with the cleat. The strain gauge is disposed underneath the elastic metallic sheet to detect a strain of the elastic metallic sheet when the cleat is subjected to a specific force exerted by a cyclist, thereby determining the tightness between the pedal body and the cleat.

The pedal body includes a primary body portion having said front engaging portion, and a secondary body portion having said rear engaging portion and pivotably mounted on a side of the primary body portion. The pedal further includes a torsion spring disposed in between the primary and secondary body portions for biasing the secondary body portion to releasably engage the cleat. A tension adjuster is disposed on the secondary body portion and coupled to the torsion spring to facilitate tension adjustment of the torsion spring and therefore to adjust the tightness between the cleat and the pedal body.

Further benefits and advantages of the present invention will become apparent after a careful reading of the detailed description with appropriate reference to the accompanying drawings.

DETAILED DESCRIPTION OF THE INVENTION

Figure 1:
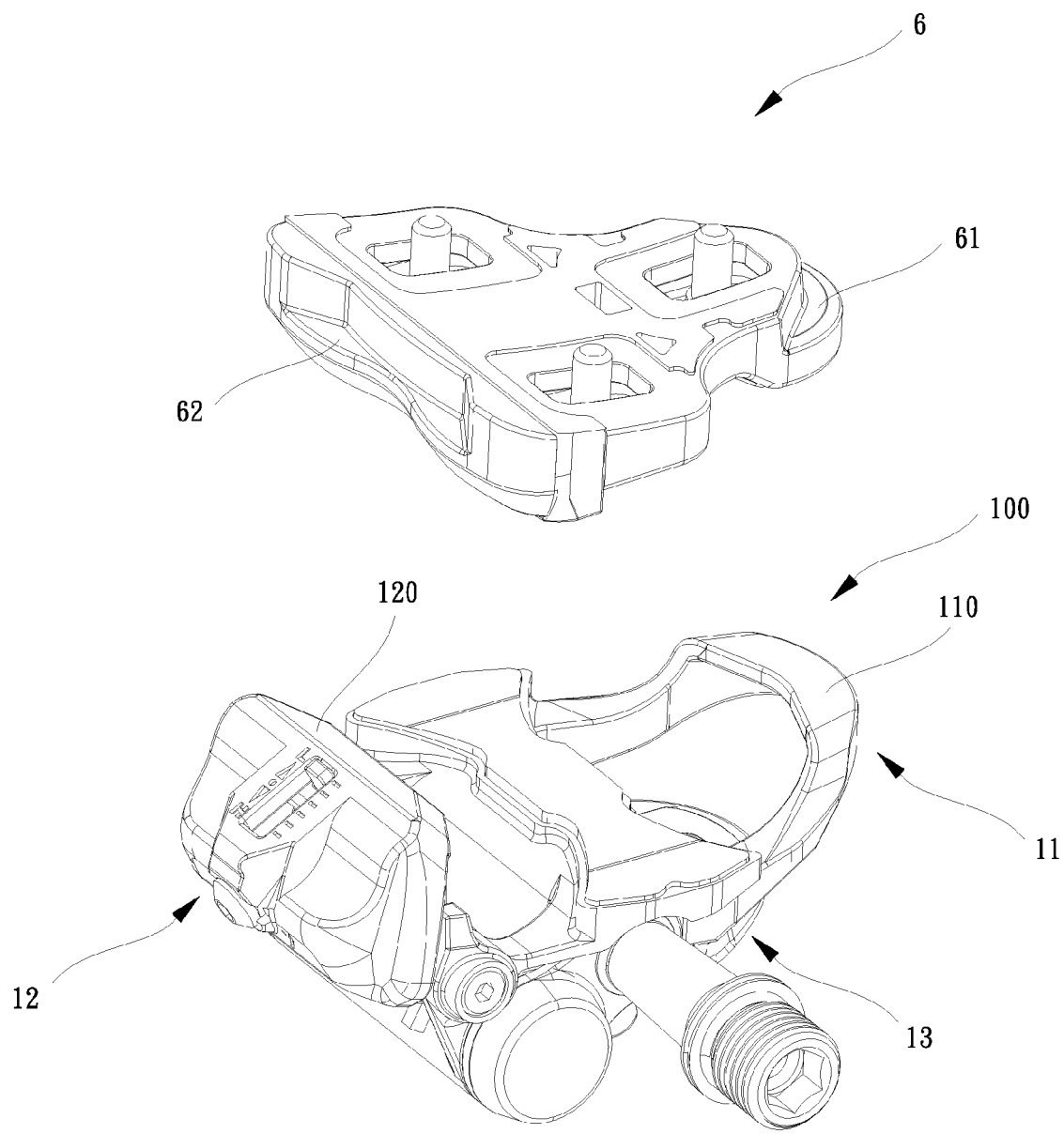
FIG. 1 is a perspective view of a pedal and a cleat according to the preferred embodiment of the present invention.
Figure 2:
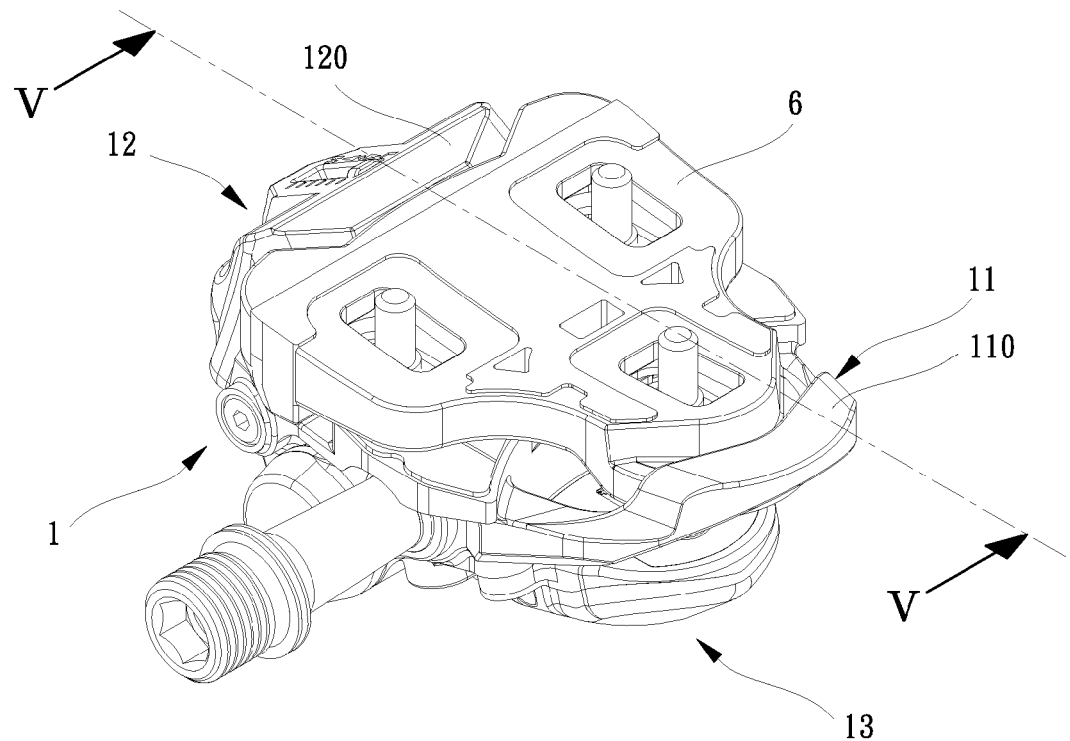
FIG. 2 is a perspective view of the pedal in combination with the cleat shown in FIG. 1, taken from another angle.

With reference now to the illustrative drawings, and particularly to FIGS. 1, 2 and 7, there is shown a clipless bicycle pedal 100 configured to be releasably secured to a cleat (see FIG. 2) attached by suitable conventional means to the sole of a rider's shoe 8 (see FIG. 7). The depicted pedal 100 is configured to function as the bicycle's left pedal, and it will be appreciated that the right pedal will be an identical mirror image of it.

Figure 3:
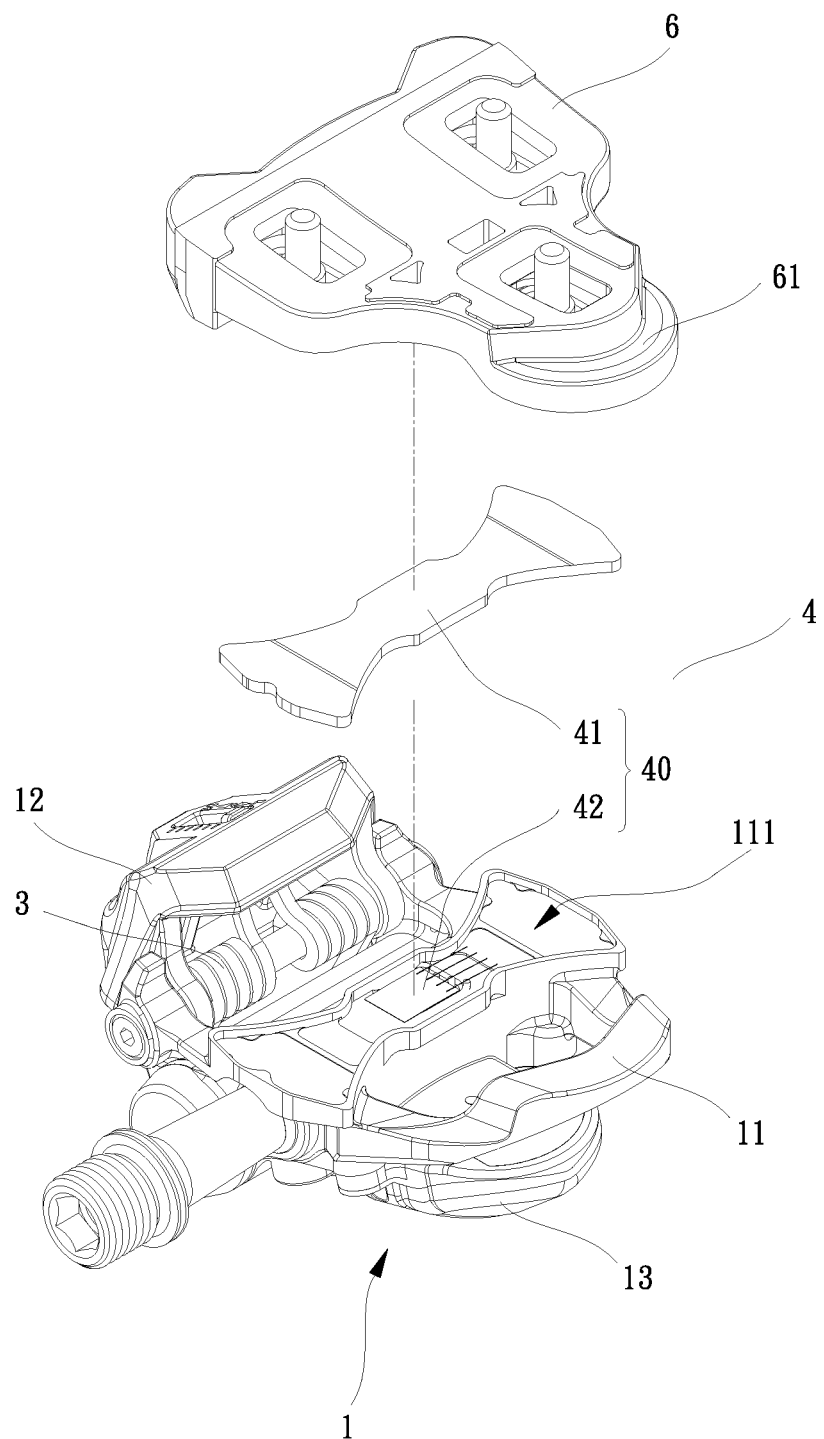
FIG. 3 is an exploded perspective view of the pedal and the cleat shown in FIG. 2.
Figure 4:
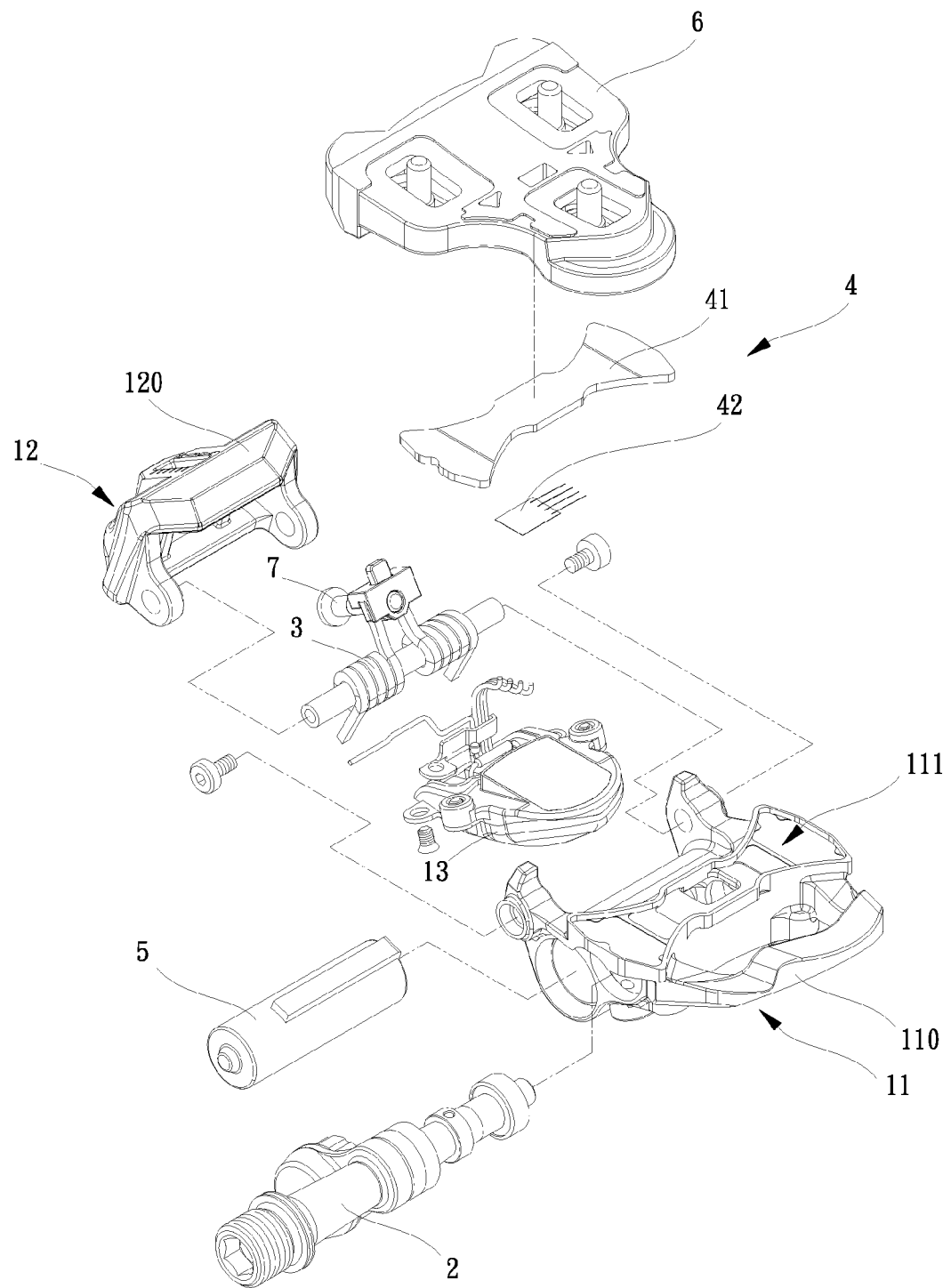
FIG. 4 is another exploded perspective view of the pedal and the cleat shown in FIG. 3.
Figure 5:
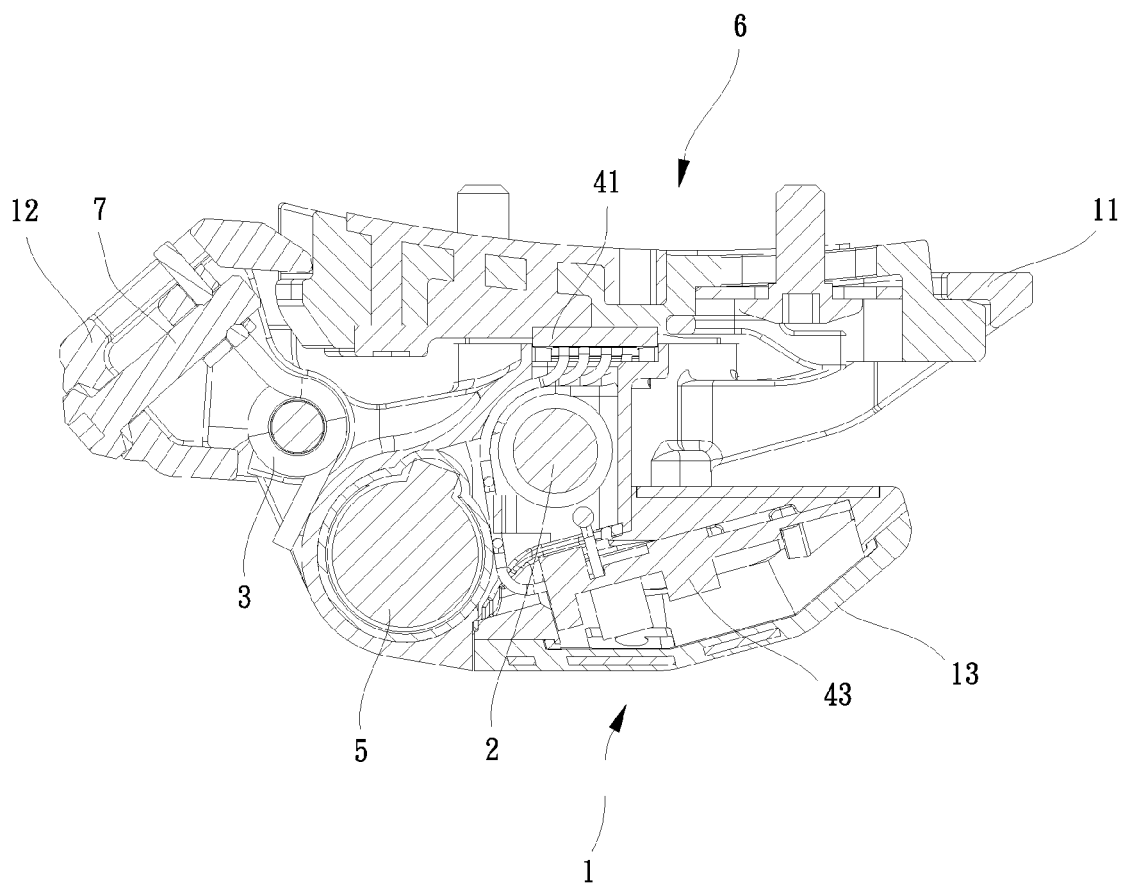
FIG. 5 is a cross-sectional view of the pedal and the cleat taken along the line V-V in FIG. 2.
Figure 6:
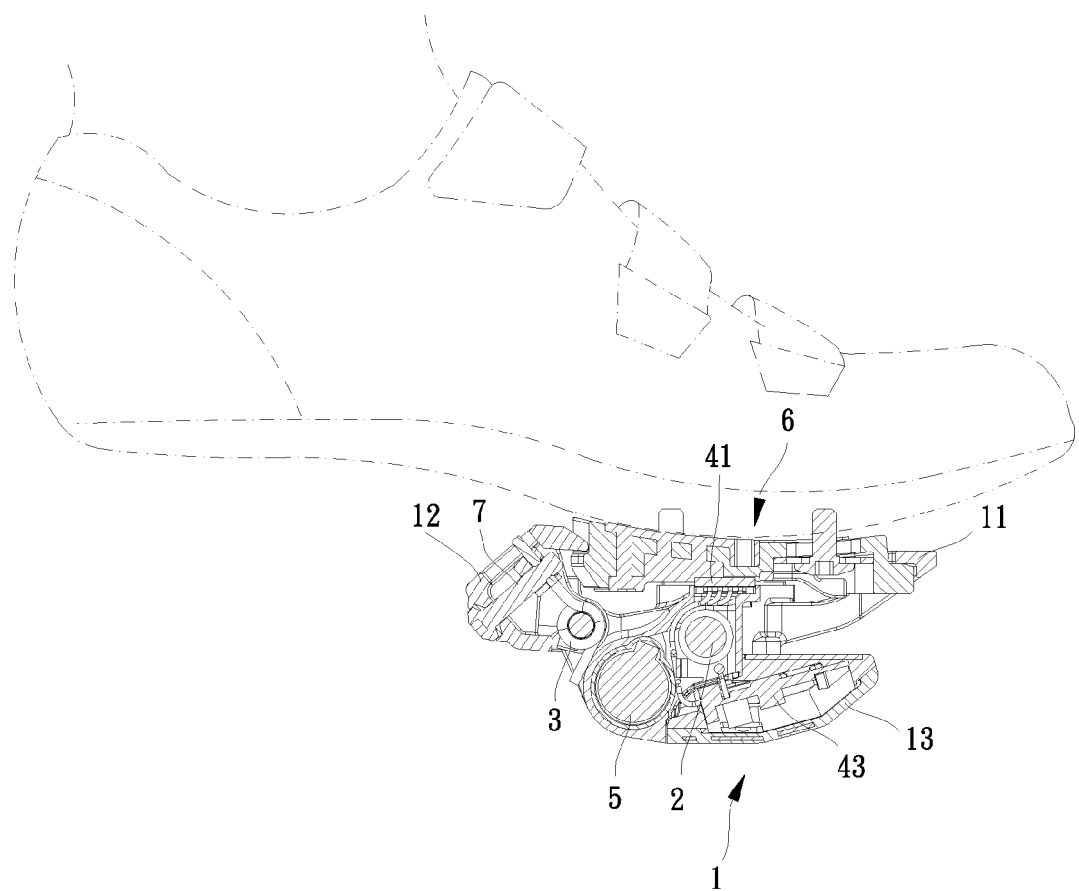
FIG. 6 illustrates that the combination of the pedal and the cleat in FIG. 5 is engaged with a cyclist's shoe.

As is conventional, the pedal 100 includes a spindle 2 attached to the bicycle's pedal crank (not shown) and a pedal body 1 mounted for rotation on the spindle 2. As shown in FIG. 1, the pedal body 1 has front and rear engaging portions 110, 120 which releasably engage with respective front and rear lips 61, 62 of the cleat 6 when the pedal 100 is secured to the cleat 6, as shown in FIG. 2. Specifically, as best seen in FIG. 4, the pedal body 1 includes a primary body portion 11, a secondary body portion 12 pivotably mounted on a side of the primary body portion 11 and a tertiary body portion 13 mounted underneath the primary body 11. The front engaging portion 110 is incorporated in the primary body portion 11 while the rear engaging portion 120 is incorporated in the secondary body portion 12. As shown in FIGS. 3-5, a torsion spring 3 is included in between the primary and secondary body portions 11, 12 for biasing the secondary body portion 12 to releasably engage the cleat 6.

As described above, the front and rear engaging portions 110, 120 of the pedal body 1 releasably engage with the respective front and rear lips 61, 62 of the cleat 6. However, it is noted that the tightness between the cleat 6 and the pedal body 1 may be gradually reduced as the cleat 6 is worn out over time. It is also noted that a loose cleat 6 may cause an incorrect measurement of force developed by the cyclist during the pedaling. For this, the pedal 100 further employs a measuring device 4 having a sensor 40 to detect the tightness between the pedal body 1 and the cleat 6, as shown in FIG. 3.

As shown in FIGS. 4 and 5, the sensor 40 generally includes an elastic metallic sheet 41, a strain gauge 42 and an electronic card 43 (see FIG. 5) disposed in the tertiary body portion 13 of the pedal body 1. The elastic metallic sheet 41 is disposed on a top surface 111 of the primary body portion 11 of the pedal body 1 to contact with the cleat 6. The strain gauge 42 is disposed underneath the elastic metallic sheet 41 to detect a strain of the elastic metallic sheet 41 when the cleat 6 attached thereto is subjected to a specific force exerted by the cyclist, so as to determine the tightness between the pedal body 1 and the cleat 6. It is appreciated that the sensor 40 may also be configured to detect forces developed by the cyclist on the pedal 100 during the pedaling. The electronic card 43 is coupled to the sensor 40 and includes an emitter (not shown) capable of emitting measurement data to a display device, such as a mobile phone or an on-board display device. In this way, the cyclist can be informed of the tightness between the cleat 6 and the pedal body 1. Moreover, a battery 5 is positioned in the pedal body 1 and substantially parallel with the spindle 2 for powering the measuring device 4.

Preferably, as shown in FIGS. 4 and 5, the pedal 100 further includes a tension adjuster 7 disposed on the secondary body portion 12 of the pedal body 1. The tension adjuster 7 is coupled to the torsion spring 3 to facilitate tension adjustment of the torsion spring 3 and therefore to adjust the tightness between the cleat 6 and the pedal body 1.

Although the invention has been explained in relation to its preferred embodiment, it is to be understood that many other possible modifications and variations can be made without departing from the spirit and scope of the invention as hereinafter claimed.

What is claimed is:

1. A pedal comprising:
    a spindle;
    a pedal body mounted for rotation on the spindle and having a front engaging portion and a rear engaging portion, the front engaging portion and the rear engaging portion respectively and releasably engaged with a front portion and a rear portion of a cleat which is adapted to be attached to a sole of a cyclist's shoe; and
    a measuring device disposed in the pedal body and including a sensor configured to detect a tension between the pedal body and the cleat, the sensor having an elastic metallic sheet disposed on a top surface of the pedal body to contact the cleat, and a strain gauge disposed underneath the elastic metallic sheet to detect a strain of the elastic metallic sheet when the cleat is subjected to a force exerted by the cyclist in order to determine the tension between the pedal body and the cleat.

2. A pedal as recited in claim 1, wherein the pedal body includes a primary body portion having said front engaging portion, and a secondary body portion having said rear engaging portion and pivotably mounted on a side of the primary body portion; and the pedal further includes a torsion spring disposed in between the primary and secondary body portions for biasing the secondary body portion to releasably engage the cleat.

3. A pedal as recited in claim 2, further comprising a tension adjuster that is disposed on the secondary body portion and coupled to the torsion spring to facilitate tension adjustment of the torsion spring and therefore to adjust the tension between the cleat and the pedal body.

4. A pedal as recited in claim 2, wherein the sensor of the measuring device includes an elastic metallic sheet disposed on a top surface of the primary body portion of the pedal body to contact the cleat, and a strain gauge disposed underneath the elastic metallic sheet to detect a strain of the elastic metallic sheet when the cleat is subjected to a force exerted by the cyclist so as to determine the tension between the pedal body and the cleat.

5. A pedal as recited in claim 4, wherein the sensor of the measuring device is configured to detect forces developed by the cyclist on the pedal during the pedaling.

6. A pedal as recited in claim 4, wherein the measuring device includes an electronic card coupled to the sensor and comprising an emitter which emits measurement data to a display device.

7. A pedal as recited in claim 6, further comprising a battery disposed in the primary body portion of the pedal body and substantially parallel with the spindle, wherein the measuring device is powered by the battery.

8. A pedal as recited in claim 6, wherein the pedal body further includes a tertiary body portion mounted underneath the primary body portion for accommodation of the electronic card.

* * * * *